Patented Apr. 19, 1932

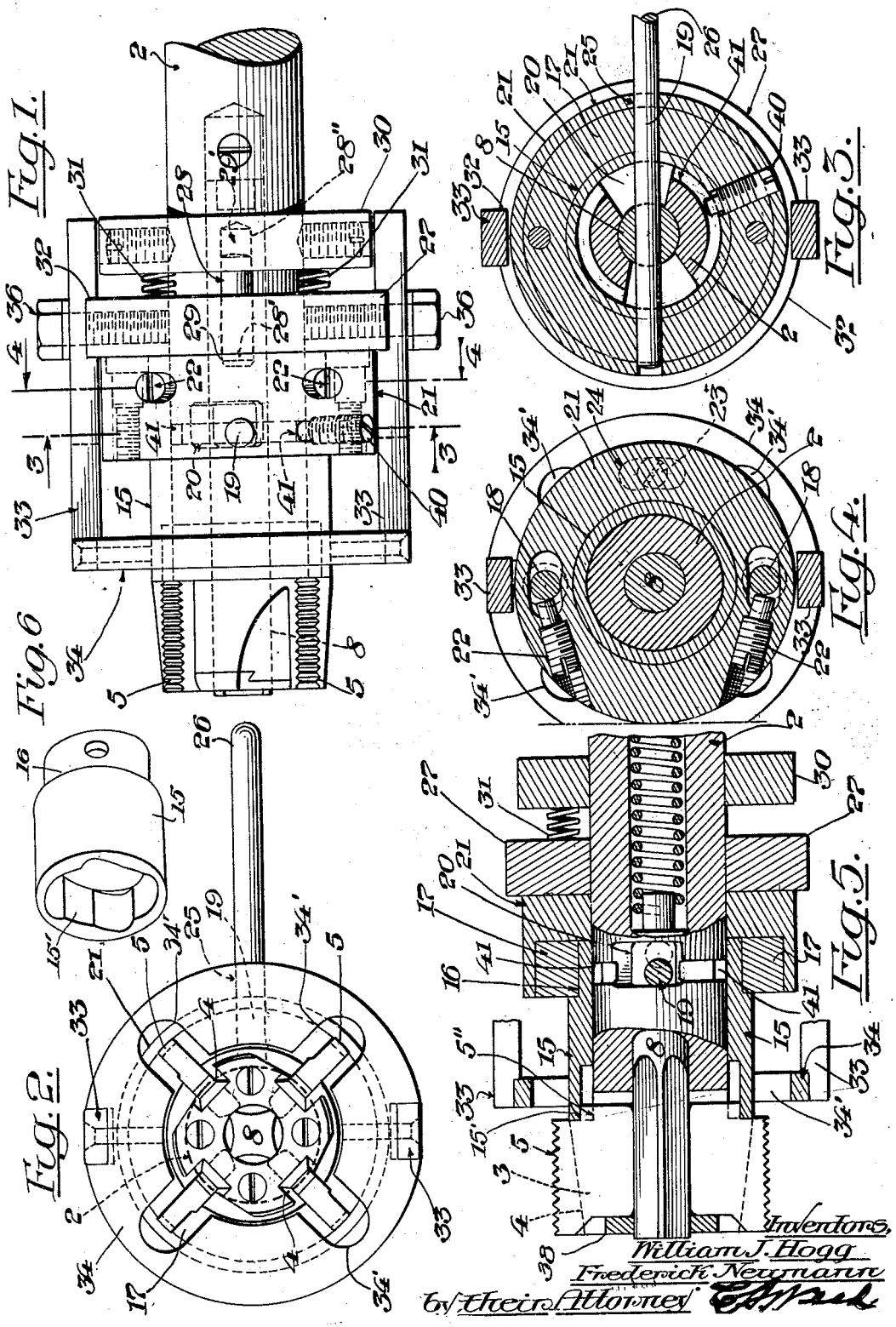

1,854,309

UNITED STATES PATENT OFFICE

WILLIAM J. HOGG AND FREDERICK NEUMANN, OF CLEVELAND, OHIO, ASSIGNORS TO THE NATIONAL ACME COMPANY, OF CLEVELAND, OHIO, A CORPORATION OF OHIO

COLLAPSIBLE TAP

Application filed December 1, 1928. Serial No. 323,097.

This invention relates to collapsible taps, the object of the invention being to improve the tap shown and described in our contemporaneously-pending application, Serial No. 247,770, filed January 19, 1928, in such a way that the chasers may be readily removed without the necessity of removing the front plate or removing the tap from the machine. In that tap, in order to remove the chasers, it is necessary to detach the end plate 38 held in position by four screws, by reason of the fact that the sleeve 15 overlaps the rear end of the chasers or cutters 5. Not infrequently these screws drop from the fingers of the operator into the chips in the pan of the machine and cannot be found, so that considerable loss of time results in either getting or making new screws to secure the plate, and thereby the chasers, in position. By means of the present improvement, however, the chasers can be readily and quickly removed without the necessity of removing this end plate and by the mere manipulation of one screw, which is not entirely removed from the tap, thus obviating the liability of its being lost. Furthermore, in the tap of the prior application referred to, it is necessary to remove the tap from the machine in order to take out the chasers when they become broken or worn, but in the present improvement the time and labor of doing this are obviated.

In the drawings accompanying and forming a part of this specification:

Figure 1 is a side view of this improved collapsible tap, parts thereof being shown in dotted lines;

Fig. 2 is a front end view of the tap;

Fig. 3 is a cross-sectional view taken on line 3—3, Fig. 1.

Fig. 4 is a cross-sectional view taken on line 4—4, Fig. 1,

Fig. 5 is a longitudinal sectional view of the tap shown in Fig. 1, and Fig. 6 is a perspective view of the cam sleeve.

Similar characters of reference indicate corresponding parts in the several views.

Before explaining in detail the present improvement and mode of operation thereof, we desire to have it understood that the invention is not limited to the details of construction and arrangement of parts which are illustrated in the accompanying drawings, since the invention is capable of other embodiments, and that the phraseology which we employ is for the purpose of description and not of limitation.

As the tap shown in the present application is in the main identically the same as that shown and described in said prior application, it is deemed unnecessary to describe in detail the several parts and the operation thereof except insofar as they have to do with the present improvement.

In the preferred form shown in the drawings, this improved tap comprises a centrally-bored cylindrical rod or shank 2 for attachment to the spindle or the tool-carrying turret of a metal working machine, by means of which the tap is usually reciprocated, respectively, into position to perform its work and away from the work after the tapping is finished, the tap or the work being rotated for threading the piece. The forward end of this rod is provided with an enlarged tapered and radially-slotted head 3 which, together with the shank 2, comprises what may be properly termed the body of the tap. In the slots 4 of this head the chasers or cutters 5 are located and guided during their inward and outward movements.

Located in the bore of this tap is a corepiece or member 8 constructed and operated in a similar manner to that described in said application. This core member has its forward end adjacent to the under faces or edges of the cutters provided with four cutter-engaging corners or edges and is a spring-wound core member, for which purpose it is connected with a coil spring located in the bore of the shank, the opposite end of which spring is fixed to the shank. After this core member is inserted into the bore of the shank, it is given two or three turns thereby to wind the spring to the desired tension and is held in this position by the cross-pin 19. The turning or rotation of the core member in one direction shifts the cutters outwardly and the reverse movement of the core member permits the cutters to be collapsed. The front end of the core projects beyond the head and is enclosed by an end-plate or cap 38. Each of the cutters is provided with a projecting tail end 5″ suitably cammed or formed for co-operation with the cam ring or sleeve about to be described. The projecting end 5″ of each cutter extends rearwardly of the head, for which purpose the radial slots 4 of the head will likewise extend rearwardly thereof.

Encircling the shank adjacent to the rearwardly-projecting ends of the cutters is a cam ring or sleeve 15 having four similarly-formed cam portions 15′ on the interior forward edge thereof for engagement with the projecting tail end of the cutters, the cam faces of the sleeve being so formed that they are always in positive engagement with the rear ends of the cutters, so that the forward tipping of the cutters when in engagement with the work is positively prevented, while at the same time, on the rotation of this cam sleeve, the cutters are positively collapsed. By a suitable adjustment of this cam sleeve, the adjustment of the cutters is regulated to the required size of the work to be tapped. This cam sleeve is recessed at its rear end 16, and located thereon is a ring 17 having a pair of rearwardly-projecting lugs 18. This ring 17 and cam sleeve 15 are pinned to the core piece 8 by a cross-pin 19, formed in the present case as part of the handle 26 hereinafter referred to and for this purpose the shank of the tap is provided with a transverse elongated slot 20 which thus permits the adjustment or rotation of the cam sleeve 15 and ring 17 together with the core piece 8 to which these members are pinned. Located on this ring 17 is a cap 21 carrying a pair of adjusting screws 22 for engagement with the rearwardly-projecting lugs 18 of the ring 17, this cap being secured to the ring by a set screw 23 passing through an elongated slot 24 in the rear wall of the cap, so that when the cap is held or locked by the means hereinafter described against rotary movement, the adjustment of these adjusting screws 22 will simultaneously adjust the cam ring and core piece and thereby position the cutters to tap the desired size of work. The cap is provided with an opening 25 for the passage of the outer end of pin 19 forming a handle 26, whereby the cam ring and core piece may be simultaneously turned to throw out the cutters into position to tap the work after they have been collapsed, and this handle may be either manually operated or automatically operated, as found desirable in practice. In the rear of this cap 21 and mounted upon the shank of the tap for shiftable or sliding movement, is a locking ring or collar 27 carrying a transversely-extending pin 28, one end of which, as 28′, projecting forwardly of the ring and the opposite end, as 28″, rearwardly thereof, the forward end extending into an opening 29 in the rear wall of the cap 21 and forming the means for holding or locking the cutters in their adjusted or working positions by reason of the engagement of the adjusting screws 22 with the lugs 18 of the ring 17. The rear end 28″ of this pin is in position to engage in a similar opening 29′ of a fixed ring or collar 30 which is pinned or fastened to the shank and which serves as a guide for the locking collar 27 as the pin 28′ is shifted out of the cap opening 29. Between these two rings 27 and 30 are located a pair of springs 31, the ends of which extend into openings formed in the rings, and which springs are compressed when the shiftable locking collar or ring 27 is moved rearwardly by the means hereinafter described.

The shiftable locking collar 27 is provided with a pair of peripheral transverse slots or recesses 32, in which is located a pair of bars 33, the forward ends of which are secured to a disk 34 suitably formed to be slipped over the head of the tap and the cutters and radially recessed, as at 34′, to permit the radial movement of the cutters. These bars at their rear ends are provided with elongated slots and are secured in the recesses 32 of the shiftable collar 27 by headed bolts 36, whereby the position of the disk on the tap with relation to this shiftable collar 27 may be adjusted. In other words, the position of the disk on the tap may be adjusted so as to shift the collar and thereby trip the cutters according to the depth of cut desired, this disk at the proper time coming into engagement with the work or a fixed piece adjacent thereto, whereby it is pushed back, thereby carrying the locking collar 27 with its locking pin 28′ out of the opening 29 in the cap and its pin 28″ into the opening 29′ of the fixed collar or ring 30, whereupon the spring on the core-piece will rotate the core and, this being pinned to the cam-sleeve 15 and ring 17, operates all of these parts together by rotating them the desired distance and consequently causing the cam to trip or collapse the cutters inwardly and release them from the work.

In the present improvement, the cam sleeve 15 is not only rotatable but is also longitudinally shiftable, it being secured to the shank by a dog-screw 40, and for this purpose the shank 2 is provided with an annular groove 41 whereby, when the screw projects thereinto, the sleeve is held against any longitudinal movement relatively to the shank 2 while the sleeve, however, can be rotated in the manner hereinbefore described. When, however, this screw 40 is backed up—a predetermined distance so as to carry it out of the groove 41, the sleeve can be shifted backward,—this being permitted by reason of the fact that the transverse elongated slot 20, through which the cross-pin 19 passes and by means of which the ring 17, cam-sleeve 15 and core-piece 8 are secured together, is made wider or elongated, see Fig. 5, as compared with the tap of the application referred to, so that the sleeve and the cross-pin 19 can be shifted backward. When the sleeve is shifted forwardly to engage the tail ends of the cutters, the dog-screw is turned down and projects into the groove 41 and thus prevents any longitudinal movement of the sleeve. Thus, by this simple means, it is practicable to remove the cutters without removing the screws of the end-plate or the end-plate 38 and without any liability of losing the screws of the end-plate or the dog-screw, since this is not entirely removed from the machine. As the dog screw 40 extends both through the ring 17 and cap 21, it is readily accessible for manipulation, thereby to permit the rotatable cam sleeve 15 to be shifted backward to release the chasers and permit their withdrawal without the necessity of removing the end plate 31.

It is to be understood that by describing in detail herein any particular form, structure or arrangement, it is not intended to limit the invention beyond the terms of the several claims or the requirements of the prior art.

Having thus explained the nature of our said invention and described a way of constructing and using the same, although without attempting to set forth all of the forms in which it may be made, or all of the modes of its use, we claim:

1. A collapsible tap comprising a bored and radially slotted body, a plurality of radially shiftable cutters located in the slots of said body, means for supporting the under faces of the cutters and positively expanding them, an end plate for holding the cutters in position, a single rotatable sleeve mounted on the body and overlapping the rear ends of the cutters to prevent the tipping thereof and effective to positively retract the cutters, said body having an annular groove, and means co-operating with the sleeve and body groove for maintaining the sleeve in one position to hold the cutters in their operating position and retractable from the groove to permit the sleeve to be retracted directly on the body thereby to permit the removal of the cutters.

2. A collapsible tap comprising a body having a plurality of radially shiftable cutters, means for shifting the cutters outwardly, and a single rotatable sleeve carried by the body for engaging the cutters to shift them inwardly on the rotation thereof and also longitudinally shiftable directly on the body for releasing the cutters to permit the removal thereof.

3. A collapsible tap comprising a body having a plurality of radially shiftable cutters, means for shifting the cutters outwardly, and a single rotatable sleeve carried by the body for engaging the cutters to shift them inwardly on the rotation thereof and also longitudinally shiftable directly on the body for releasing the cutters to permit the removal thereof, said sleeve overlapping the tail ends of the cutters to prevent the tipping thereof.

4. A collapsible tap comprising a body having a plurality of radially shiftable cutters, means for shifting the cutters outwardly, a single rotatable sleeve carried by the body for engaging the cutters to shift them inwardly on the rotation thereof and being also longitudinally shiftable directly on the body for releasing the cutters to permit the removal thereof, said sleeve overlapping the tail ends of the cutters to prevent the tipping thereof, and means for connecting the sleeve with the body and comprising an annular groove in the body and a screw passing through the sleeve in position to engage the groove and prevent longitudinal movement of the sleeve and retractable into position at another time to permit longitudinal movement of the sleeve.

5. A collapsible tap comprising a bored and radially-slotted body adapted to carry a plurality of radially-shiftable cutters located in the slots of said body, means for supporting under faces of said cutters and positively expanding them, and a single rotatable means carried by the body and engaging outer portions of the cutters and rotatable relatively to the body and cutters for retracting the cutters and longitudinally shiftable directly on the body and the cutters to permit the removal of the cutters, said cutters and rotatable means one having cam-formed faces.

6. A collapsible tap comprising a bored body having a transverse elongated slot and adapted to carry a plurality of radially-shiftable cutters, a rotatable core located in said bore for shifting the cutters outwardly, a rotatable cam-formed sleeve carried by the body for engaging the cutters and rotatable relatively to the body and cutters to shift them inwardly and also longitudinally shiftable relatively to the body for releasing the cutters to permit the removal thereof, said sleeve overlapping the tail ends of the cutters to prevent the tipping thereof, an adjusting ring carried by the sleeve, a cap encircling the ring, a pin projecting through the elongated slot of the body and pinning the ring, cam sleeve and core together for rotatable movement, and means connecting the rotatable cam sleeve with the body to permit longitudinal movement thereof and comprising an annular groove in the body and a screw passing through the sleeve in position to engage the groove and prevent longitudinal movement of the sleeve at one time and retractable from the groove at another time to permit longitudinal movement of the sleeve, said screw extending through the ring and the cap whereby it is readily accessible for manipulation.

7. A collapsible tap comprising a bored and radially-slotted body adapted to carry a plurality of radially-shiftable cutters located in the slots of said body, said body having a transverse elongated slot, a rotatable core located in the bore of said body for supporting under faces of the cutters and positively expanding them, a rotatable and longitudinally-shiftable sleeve for supporting outer faces of the cutters to prevent the tipping thereof and effective on the rotation thereof to positively retract the cutters and on the longitudinal shifting thereof relatively to the body and cutters to release the cutters and permit the removal thereof, an adjusting ring carried by said sleeve, a pin projecting through the elongated slot of the body and pinning the ring, sleeve and core together for rotatable movement, a cap encircling said ring, and co-operating means carried by the body and sleeve, one part thereof being adjustable relatively to the other, for preventing longitudinal movement of the sleeve in one position and on the adjustment of said part permitting longitudinal movement of said sleeve, said adjustable part extending through the ring and the cap whereby it is readily accessible for manipulation, said sleeve and cutter one having cam-formed faces.

8. A collapsible tap comprising a body, a plurality of cutters carried thereby, spring wound means for shifting the cutters outwardly, means for retracting the cutters and comprising a sleeve, and means connecting the sleeve with the body to permit shiftable movement of the sleeve thereby to permit the removal of the cutters and comprising an adjustable screw cooperating with an annular groove carried by the body and communicating with an elongated widened slot also carried by the body.

9. A collapsible tap comprising a body, a plurality of cutters carried thereby, means for shifting the cutters outwardly, means for retracting the cutters and comprising the sleeve, means connecting the sleeve with the body to permit shiftable movement of the sleeve thereby to permit the removal of the cutters, said means comprising an annular groove in the body and a widened slot, and a screw projecting through the sleeve into said groove and adapted in one position to hold the sleeve in engagement with the cutters and in another position shiftable axially of the body into the widened slot to permit the retraction of the sleeve from the cutters.

10. A collapsible tap comprising a body having a plurality of radially-shiftable cutters, means for shifting the cutters outwardly, a rotatable sleeve carried by the body for engaging the cutters to shift them inwardly on the rotation thereof and also longitudinally shiftable relatively to the body for releasing the cutters to permit the removal thereof, said sleeve overlapping the tail ends of the cutters to prevent the tipping thereof, and means connecting the sleeve with the body and comprising an annular groove in the body having a widened slot-formed portion and a screw passing through the sleeve in position to engage the groove and prevent longitudinal movement of the sleeve and adjustable into position at another time for movement axially of the body into the widened slot to permit longitudinal movement of the sleeve.

Signed at Cleveland, Ohio, this 12th day of November, 1928.

WILLIAM J. HOGG.
FREDERICK NEUMANN.